March 3, 1964  H. HAUTMANN  3,122,980
AUTOMATIC DIAPHRAGM ARRANGEMENT FOR CAMERAS
Filed Nov. 13, 1959
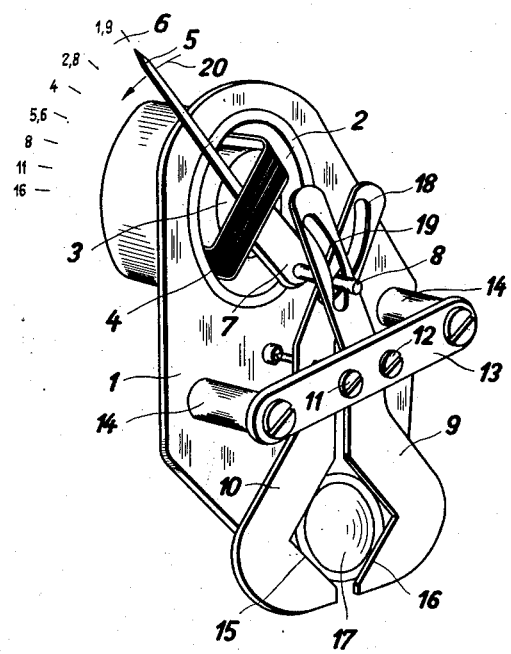

United States Patent Office 3,122,980
Patented Mar. 3, 1964

3,122,980
AUTOMATIC DIAPHRAGM ARRANGEMENT
FOR CAMERAS
Heinrich Hautmann, Erlangen, Bavaria, Germany, assignor to P. Gossen & Co., G.m.b.H., Erlangen, Bavaria, Germany, a firm
Filed Nov. 13, 1959, Ser. No. 852,646
Claims priority, application Germany Aug. 20, 1959
5 Claims. (Cl. 95—64)

The present invention relates to a diaphragm arrangement for photographic cameras in which the exposure aperture is adjusted as a function of the light intensity striking a photoelectric cell, the adjustment of the diaphragm being fully automatic.

It is known to control the exposure aperture of a camera automatically in accordance with the light falling on a photoelectric cell, but in the past such arrangements have been complex and rather bulky.

The object of the invention is to provide an automatic diaphragm adjustment arrangement which is very simple and compact and yet has an especially desirable mechanical transmission ratio from the measuring device to the diaphragm vanes over the entire range of operation.

Another object of the invention is to operate the exposure aperture diaphragms directly by a galvanometer energized only by the photoelectric current, thereby providing a simple compact arrangement.

As more fully explained hereinbelow, the automatic diaphragm according to the present invention consists of two diaphragm vanes which are mounted centrally or eccentrically, and are operated by a measuring instrument which is photoelectrically controlled. The two vanes have near their adjacent ends cut-out spaces which form the exposure aperture proper, and the arrangement is substantially characterized in that the other ends of the diaphragm vanes overlap and have control slots of similar shape arranged so that they intersect in any of their positions. A single control pin extends through the slots at their point of intersection, said pin being connected to the rotary coil, of the measuring instrument by means of a lever arm.

By means of this arrangement the assembly of the diaphragm vanes with the measuring instrument can be made in a very compact unit of the smallest dimensions, and, on the other hand, the automatic diaphragm arrangement according to the invention operates very satisfactorily over the entire range of the diaphragm, as far as the mechanical transmission ratio from the measuring device to the diaphragm vanes is concerned. The transmission ratio is the same in both diaphragm vanes for each exposure aperture and is largest when the exposure aperture is largest, i.e., when the diaphragm starts acting.

In the accompanying drawing an automatic diaphragm arrangement constituting one embodiment of the invention is illustrated by way of example.

As seen in the drawing, a base plate 1 is provided for mounting the entire unit. On the base plate a measuring instrument comprising a rotary coil mechanism is provided which consists of an iron cylinder 2, a core magnet 3, and a coil 4. The coil 4 is connected by means of helical wires to a photoelectric cell, the wires and the cell not being shown in the drawing. The unit is adapted for insertion into a still or movie camera.

Connected to the rotary coil is a pointer 5 which moves over the diagrammatically shown scale 6. The coil 4 furthermore has attached thereto an arm 7 on which is mounted a control pin 8, the function of which is described more fully hereinbelow.

The diaphragm itself comprises two vanes 9 and 10 arranged in two adjacent parallel planes; both vanes are supported substantially near their center as shown. To take up play, the bearings can be finely adjusted by means of screws 11 and 12. The screws have bearing jewels (not shown in the drawing), and are supported in a bridge member 13 which is mounted on the base plate 1 by means of spacing bolts 14.

The lower ends of the diaphragm vanes are cut out as shown at 15 and 16, the cut-outs together forming the exposure aperture proper and being arranged in the path of the rays of the optical system 17.

The other end of the diaphragm vanes overlie each other and have slots 18 and 19, which intersect in any position of the diaphragm vanes. The control pin 8 extends through slots at the point of intersection.

In the position shown, the automatic diaphragm has its largest aperture. When a photoelectric cell, to which the measuring instrument is connected, is illuminated, the coil 4 is rotated in the direction of the arrow 20. During this movement, the diaphragm aperture 15, 16 is more or less closed by means of the pin 8 and the two similarly shaped slots 18 and 19, the exact amount of movement and the closing of the aperture depending on the amount of light falling on the photoelectric cell.

It can be easily seen that the effective lever arm which controls the movement of the diaphragm is smallest at the beginning of the diaphragm range, i.e., when the exposure aperture is largest. This is true of both diaphragm vanes. In this manner one of the objects of the invention is achieved, in that the mechanical transmission ratio from the rotary coil to the diaphragm vanes is the same at every angle of rotation for each of the two vanes, and is largest at the beginning of the diaphragm range, that is, when the vanes have to cover the largest path per degree of movement of the pointer over the scale of the measuring instrument.

The arrangement according to the invention has the advantage, as compared to presently known arrangements, that there is permitted a great deal of variability in the spatial arrangement of the measuring device. Depending on the space left free by the assembly of the other camera parts the measuring instrument may be placed to the left or the right of the upper end of the diaphragm vanes; whereby the space for the rocking of the vanes obtained within the casing can be made quite considerable. If necessary, in an extreme case, the measuring instrument can be so positioned that the iron cylinder of the rotary coil assembly of a construction similar to the one shown, may be adjacent one of the spacing bolts 14.

I claim:

1. In an automatic diaphragm arrangement for photographic cameras wherein two mounted diaphragm vanes are operated by a photoelectrically controlled measuring instrument including a rotary coil, and wherein two adjacent portions of the vanes are shaped to form the exposure aperture proper; the improvement constituted by other portions of the two diaphragm vanes overlying each other and having respective control slots of similar shape which are so arranged that they intersect in every position thereof, two separate laterally spaced pivots for mounting said diaphragm vanes, a lever arm extending from the rotary coil of the measuring instrument, and a single control pin fixed to said lever arm and extending through said slots at the point of intersection of said slots for moving said vanes.

2. In an automatically controlled diaphragm arrangement for a photographic camera, a pair of complementary diaphragm vanes having similarly shaped portions at one end defining an exposure aperture, said vanes having respective curved slots in close proximity to their other ends, one of said vanes overlying the other so that said slots intersect at similarly located points thereof, two separate laterally spaced pivots for respectively mounting each of said vanes at an intermediate point thereof, a rotary coil, means for producing a rotation of said coil in response to a current supplied thereto, and means including a single member connected to said rotary coil and extending through the slots at said intersection thereof for rotating said vanes on their respective pivots at equal rates.

3. Apparatus according to claim 2, wherein said single member includes an arm extending radially from said coil and a pin fixedly mounted on said arm and extending through said slots, said pin and said vanes being located relative to each other so that the angular rotation of the vanes relative to the rotation of the coil decreases as the exposure aperture decreases.

4. In an automatically controlled diaphragm arrangement for a photographic camera, a base plate, a pair of complementary diaphragm vanes having similar cut out portions defining an exposure aperture, said vanes having respective similarly shaped slots in another portion thereof, one of said vanes overlying the other so that said slots intersect at similarly located points of said vanes, two laterally spaced pivots for respectively mounting each of said vanes on said base plate at a point intermediate its slot and cut out portion, current measuring means including a rotary coil rotatable in response to a current supplied thereto, and means including a single pin connected to said rotary coil and parallel to the axis of rotation thereof and extending through said slots at the intersection thereof for rotating said vanes about the pivot points whereby the current measuring means may be provided at other positions on the base plate around the diaphragm vanes.

5. In an automatically controlled diaphragm arrangement for a photographic camera, a pair of complementary diaphragm vanes having similar cut out portions defining an exposure aperture, said vanes having respective similarly shaped slots in another portion thereof, one of said vanes overlying the other so that said slots intersect at similarly located points of said vanes, means for pivotally mounting each of said vanes at a point intermediate its slot and cut out portion, a current meter including a rotary coil means for rotation in response to a current supplied thereto, and means including a single pin fixedly connected to said rotary coil means and extending parallel to the axis of rotation thereof and through said slots at the intersection thereof for rotating said vanes at rates relative to the rotation of said coil means which vary in accordance with the size of the exposure aperture.

References Cited in the file of this patent
UNITED STATES PATENTS

| | | |
|---|---|---|
| 2,421,499 | Guedon | June 3, 1947 |

FOREIGN PATENTS

| | | |
|---|---|---|
| 1,182,695 | France | Jan. 19, 1959 |
| 1,193,034 | France | Apr. 27, 1959 |
| 1,193,902 | France | May 4, 1959 |